June 28, 1938.   R. RUMMEL   2,122,352
ROTARY BLOWER, GAS METER, LIQUID METER,
ROTARY COMPRESSOR, AND ROTARY PUMP
Filed April 1, 1936   4 Sheets-Sheet 2
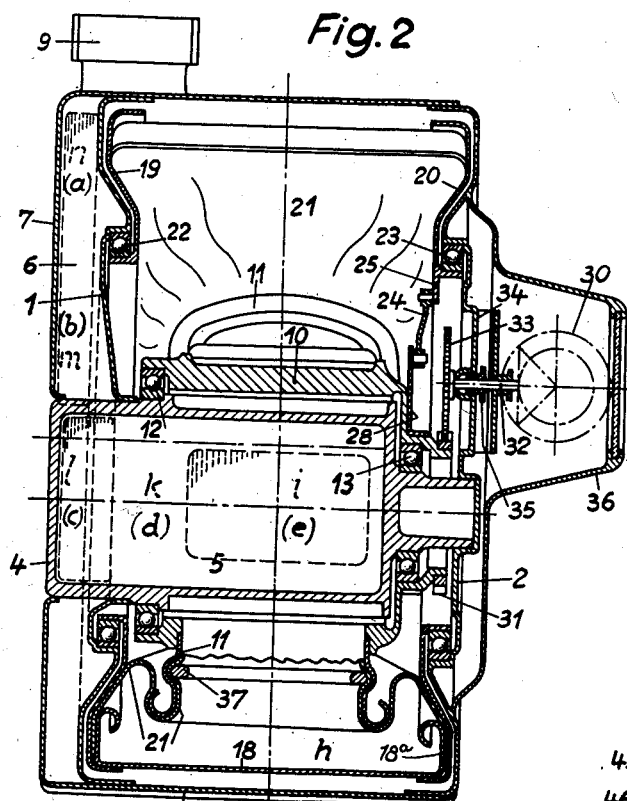
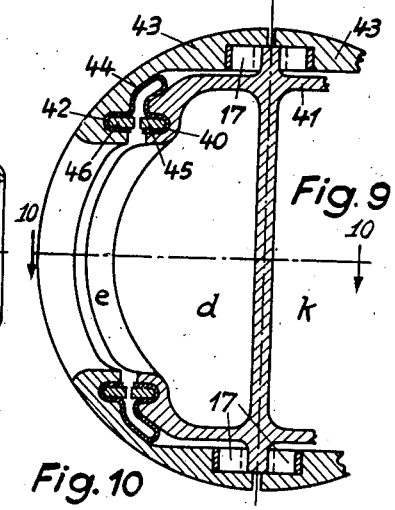
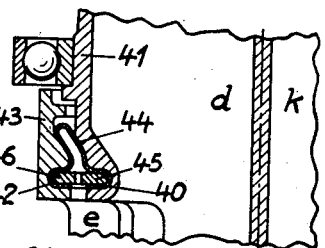
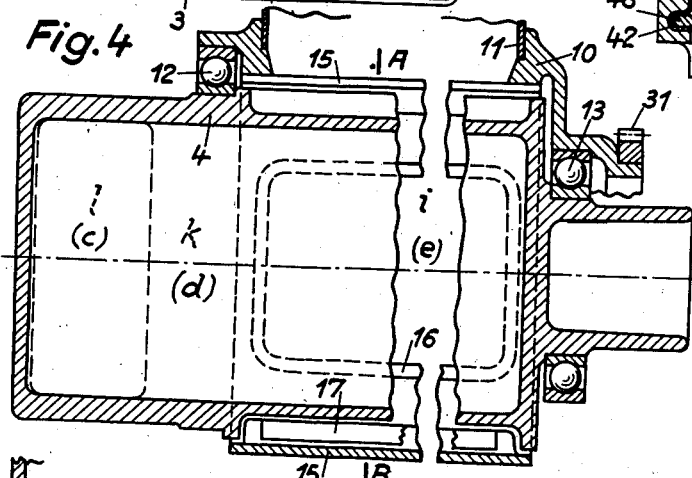
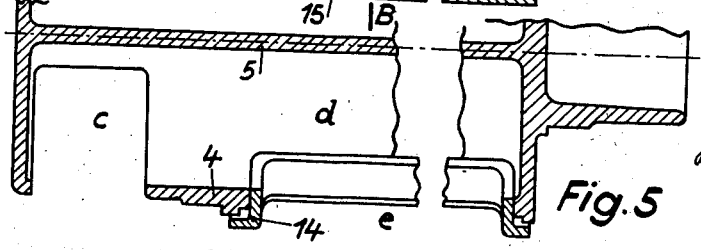
Inventor
Roman Rummel
By B. Singer
Attorney June 28, 1938. R. RUMMEL 2,122,352
ROTARY BLOWER, GAS METER, LIQUID METER,
ROTARY COMPRESSOR, AND ROTARY PUMP
Filed April 1, 1936 4 Sheets-Sheet 3
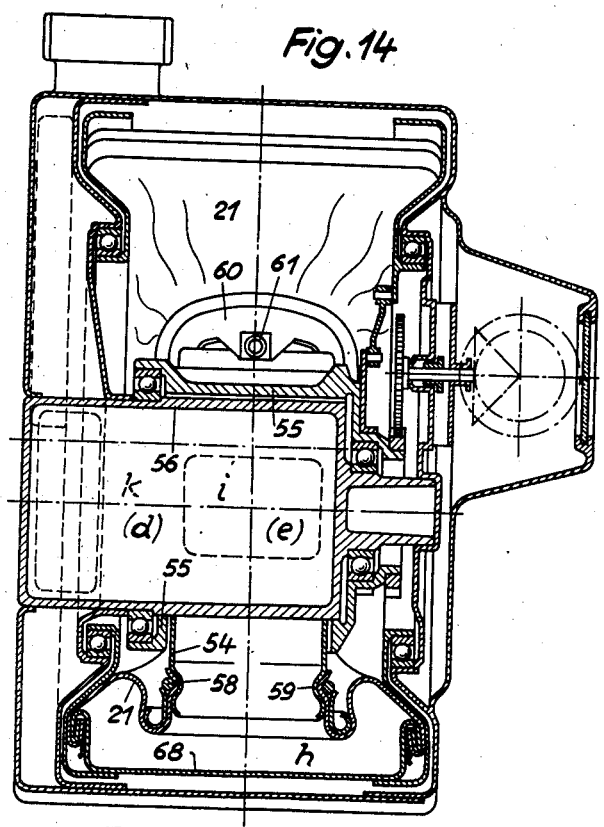
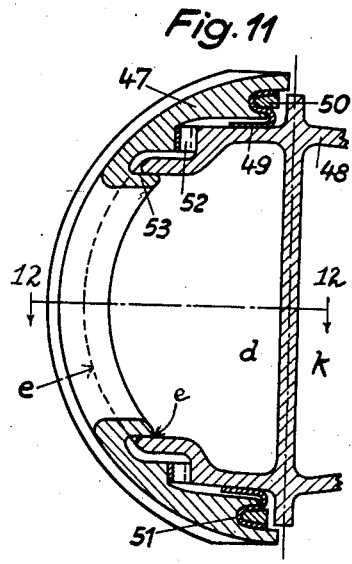
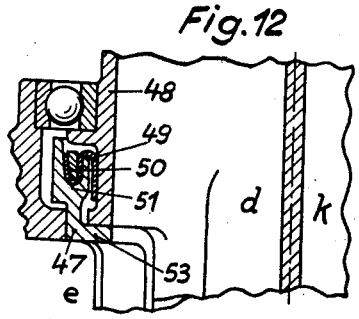
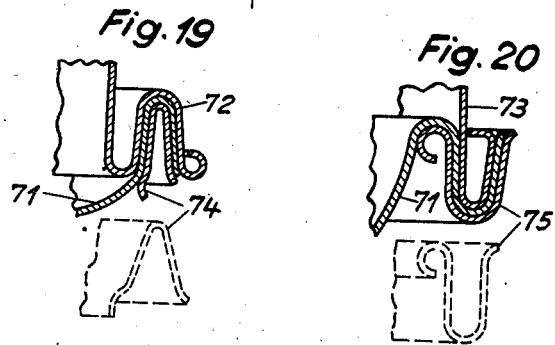
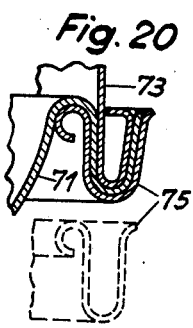
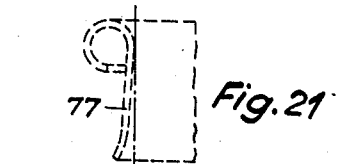
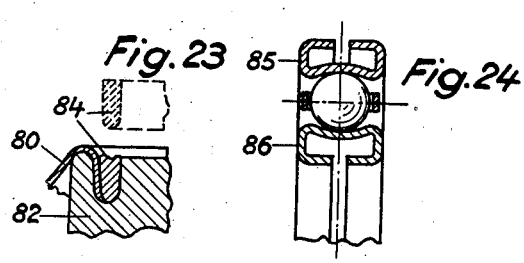
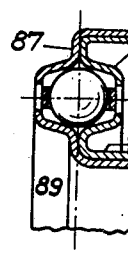
Inventor
Roman Rummel
By B. Singer
Attorney June 28, 1938.    R. RUMMEL    2,122,352
ROTARY BLOWER, GAS METER, LIQUID METER,
ROTARY COMPRESSOR, AND ROTARY PUMP
Filed April 1, 1936    4 Sheets-Sheet 4
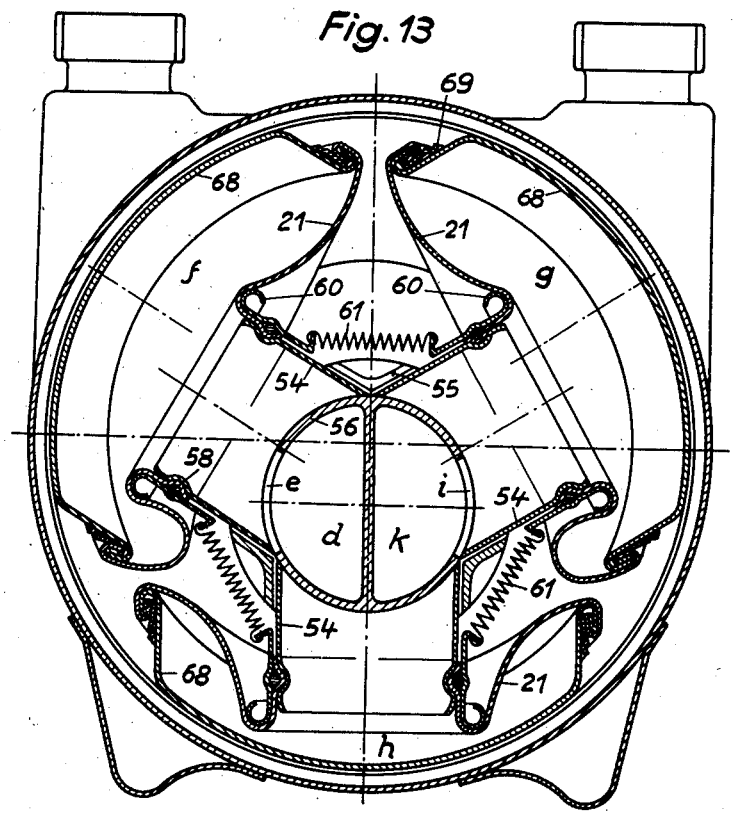
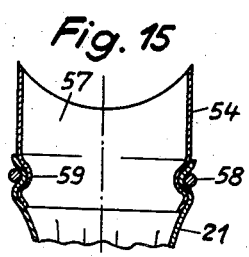
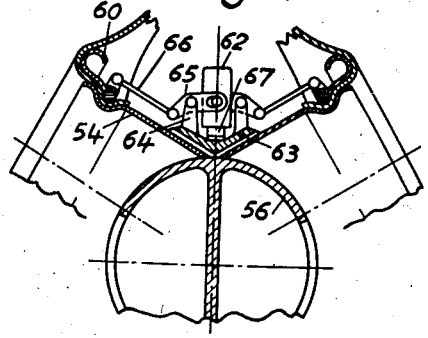
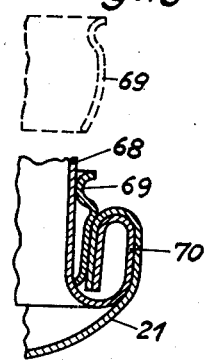
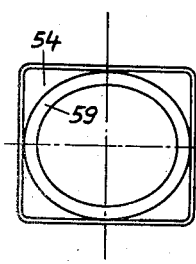
Inventor
Roman Rummel
By B. Singer
Attorney Patented June 28, 1938

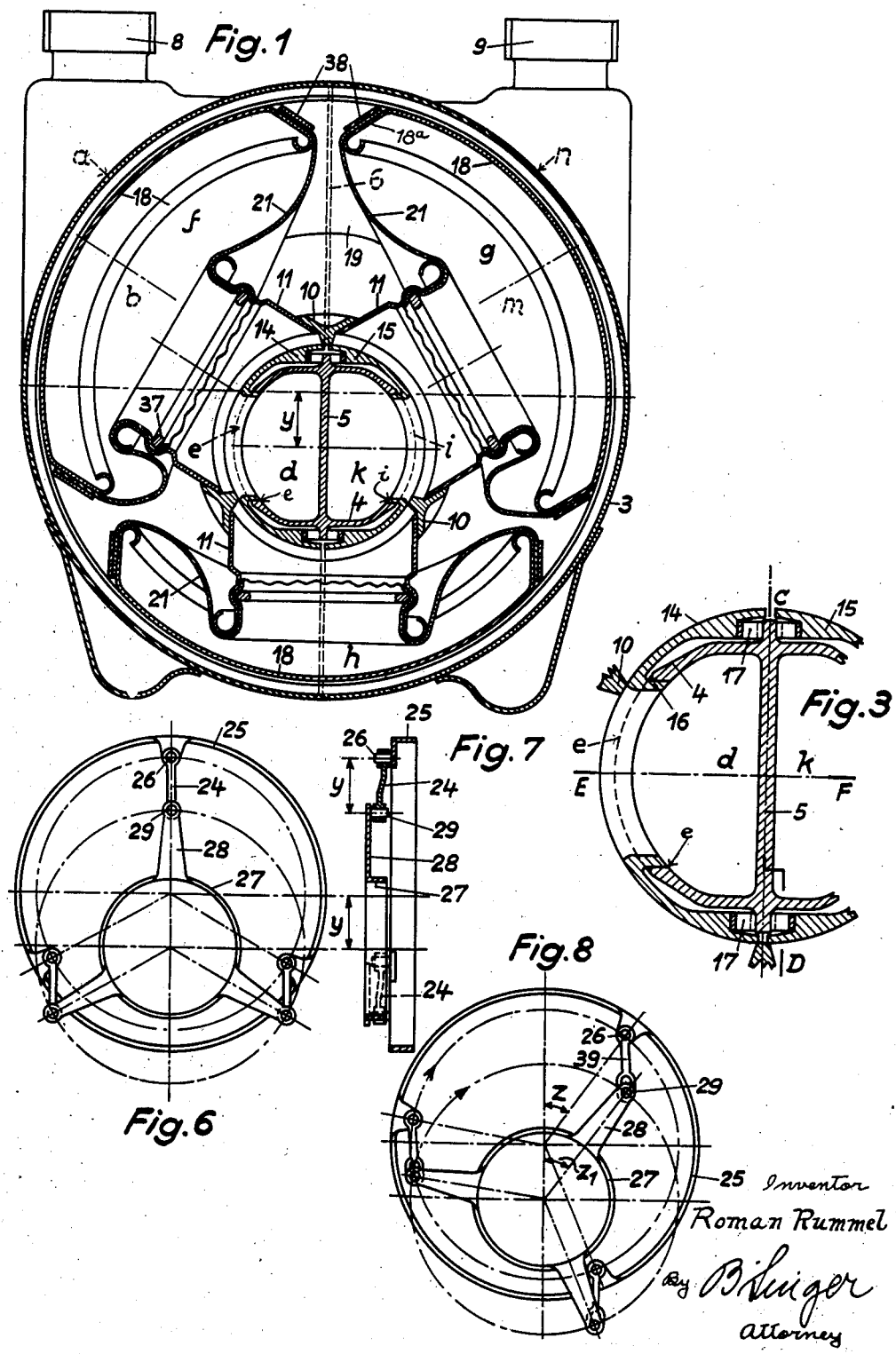

2,122,352

UNITED STATES PATENT OFFICE 2,122,352

ROTARY BLOWER, GAS METER, LIQUID METER, ROTARY COMPRESSOR, AND ROTARY PUMP

Roman Rummel, Vienna, Austria

Application April 1, 1936, Serial No. 72,086
In Austria April 3, 1935

11 Claims. (Cl. 103—121)

The present invention relates to an improvement of a positive displacement rotary blower, a rotary gas meter, a rotary liquid meter, a rotary compressor and so on.

More particularly the invention relates to devices of the type comprising a cylindrical rotor within a cylindrical blower etc. casing and rotatable on an axis eccentric to the axis of the casing, the said rotor being provided with separately movable blades or pistons running with their outer or free end on the inner wall of the casing.

The improvement consists in providing flexible walls between the piston and the drum. Preferably said flexible walls consist of a tight and flexible material; they divide the working or measuring chamber between piston and drum into a number of gas tight separate and independent chambers.

The main object of the invention is further to reduce the friction of the piston blades hitherto used. This is especially important when the device is used for measuring gas where the occurring pressures are rather low.

A further object of my invention is to provide a simpler and cheaper device.

With these and other objects in view my invention consists in the elements and in the combination of the elements as herein described and for the purposes set forth.

In the accompanying drawings several preferred modes of construction are shown by way of example.

In the drawings:

Figs. 1 and 2 show a longitudinal and a cross section of a gas meter in which a gas tight and flexible material has been used to form the yieldable walls.

Fig. 3 shows on a larger scale a section on line A—B of Fig. 4.

Fig. 4 is a section on line C—D of Fig. 3.

Fig. 5 shows a section on line E—F of Fig. 3.

Figs. 6 and 7 show in front and in side elevation the connection of the casing with the piston by means of three coupling rods.

Fig. 8 shows a slightly different connection in another position of the parts.

Figs. 9 and 10 show in cross section and in longitudinal section on line 10—10 of Fig. 9 a modification of the interior casing.

Figs. 11 and 12 show another modification of the device also in cross section and in longitudinal section on line 12—12 of Fig. 11.

Figs. 13 and 14 show a third modification of the device in cross section and in longitudinal section, and Figs. 15 to 25 show details.

Referring now particularly to Figures 1 to 7 of the drawings, it will be seen that the piston and drum are contained within a casing which is constituted by the vertical walls 1 and 2 and the peripheral wall 3, there being another vertical wall 7 spaced from the wall 1 to provide a chamber which is divided into an inlet compartment $b$ and an outlet compartment $m$ by a vertical cross partition or intermediate wall 6. The inlet 8 communicates through a peripheral opening $a$ in the wall 3 with the chamber $b$ only while the chamber $m$ communicates through a similar opening $n$ in the peripheral wall 3 with the outlet 9. The openings $a$ and $n$ are located between the vertical walls 1 and 7.

Located eccentrically in the casing, suitably secured stationarily therein and extending from wall 7 through wall 1 to wall 2, is a cylinder 4 that serves as a shaft on which the sleeve 10 of the piston turns and has bearing. The cylinder 4 is chambered, the chamber being separated into an inlet channel $d$ and an outlet channel $k$ by a partition 5, the channels communicating respectively with the inlet chamber $b$ and the outlet chamber $m$ of the casing through ports $c$ and $l$ respectively. The cylinder 4 also has oppositely disposed ports $e$ and $i$ with which the piston ducts 11 communicate at intervals.

The sleeve 10 of the piston is mounted on the cylindrical member 4 with anti-friction bearings 12 and 13 and includes a set of radial ducts 11 (preferably three in number) whose remote ends are rounded or curled over for a purpose later understood.

In order to maintain a gas-tight joint between cylinder 4 and sleeve 10, the cylinder may be provided with slidable sleeve-like members 14 and 15 having flanges 16 to fit snugly in the openings or ports $e$ and $i$ of the cylinder 4 and held in gas-tight contact by means of leaf springs 17.

The drum consists of a peripheral wall 18 and end walls 19 and 20. The drum is mounted concentrically within the casing to turn on anti-friction bearings 22 and 23, and is provided with a set (one for each duct 11) of conical flanges 18ª whose inner edges are rounded or curled inwardly for a purpose presently understood.

The flanges 18ª are cooperatively connected with their respective ducts 11 by means of yieldable walls 21 composed of suitable gas-tight flexible aprons, one end of each being secured to a flange 18ª and to a corresponding duct 11.

One way to secure the wall 21 to its flange 18ª is to secure it between the flange and an outer conical frame 38; the wall 21 may be secured to its duct 11 by means of a spring ring 37.

The drum is connected to the piston by three coupling rods 24 (preferably of flexible material). Wall 20 of the drum is provided with a ring 25 (see Figures 6 and 7) having a bolt (stud) 26 for each rod 24 on which the rod has bearing. Arms 28, carried by a second ring connected to sleeve 10 and turning with it, have bolts (studs) 29 on which the other ends of the rods 24 have bearing. The bolts 29 are spaced an equal distance from the axis of the piston and the bolts 26 are spaced a like distance from the axis of the drum, in virtue of which the circles through which the bolts move are equal in diameter. The length of the rods between the bolts 26 and 29 is equal to the eccentricity $y$ of the piston with respect to the casing.

In order that the total pressure of the fluid medium may not act on the flexible members 21, but only the pressure equal to the difference of pressure between the inlet and outlet, a small opening is preferably provided through the wall 1 at the outlet side of the partition 6. In this way the flexible members are subject to less wear than would otherwise be the case.

So far as described it will be seen that upon establishing a fluid pressure at inlet 8 the fluid will pass into chamber $b$ and flow through port $c$ and inlet channel $d$ to port $e$, and from thence into the chambers $f$, $g$, $h$ of the piston as their ducts come into register with the port $e$. As the piston is turned and a duct 11 registers with the port $i$, the fluid flows via outlet channel $k$ to outlet port $l$ and is delivered into outlet chamber $m$, from whence it passes to outlet 9. The movement of the drum, with respect to the piston, causes the filling and emptying of the working chambers $f$, $g$, $h$, because the flexible walls 21 vary their shape according to the respective positions of the drum and piston.

Rounding or curving the ends of the members 11 and 18a avoids sharp bending of the walls 21, and thus lengthens the life of the material used in the said walls.

The movement of the piston is transmitted to a recording or counter mechanism by means of a spur wheel 31 secured to part 10, said spur wheel engaging another spur wheel 33 secured to the shaft 32 of the counter mechanism. In the cover 34, disposed near wall 2 of the casing, there is a stuffing box 35 which tightens the shaft. The counter mechanism is protected by a cover 36.

In the modification shown in Fig. 8 the bolts 29 of the coupling rods 39 are provided with slots whereby any pressure load on the rods can be obviated. At least three rods are disposed at equal intervals on the circumference and one of them only is subjected to tensile stress. When the drum moves the lefthand rod causes the piston to move. But by reason of the slots the two righthand rods are not subjected to any stress since the lefthand rod does not allow its bolts 26 and 29 to be brought nearer the one to the other. If the drum is moved by the piston the righthand rods are subjected to tensile stress whereas the lefthand rod remains without any stress. The rods are subjected to stress one after the other only through half a revolution, during the other half revolution they hang loosely on their respective bolts. Instead of rods other coupling devices might be used, for instance wire tapes which are able to transmit only tensile stress from one part to the other. The use of rods has however the advantage that the angular velocity of piston and drum remain equal during an entire revolution. In this way a uniform working of the device is assured. The position, for instance, of bolt 26 (see Fig. 8) on the drum and of bolt 29 on the piston with respect to the axis of the drum and the piston remains equal because the angles $z$ and $z_1$ remain equal during the entire revolution. Consequently their angular velocities are equal during the entire revolution.

According to Figs. 1 and 2 the rods 24 are disposed only on one side of the drum. In larger devices the drum will be connected to the piston by rods disposed on both sides whereby a unilateral transmission of stress is obviated.

A closed frame 44 of tight and flexible material may be introduced in the opening $e$ to ensure a tight connection of the part of the casing 41 and its sliding parts 43 (see Figs. 9 and 10). The frame 44 is tightly clamped in the groove 40 of the member 41 and in the groove 42 of movable member 43. The grooves 40 and 42 are disposed around the opening $e$ and have a wedge shaped cross section. A frame 44 is secured in the grooves by means of wedge shaped frames 45, 46, the cross section of the latter being such as to be fixed firmly in the grooves and so as to clamp frame 44 firmly on its entire circumference. Leaf springs 17 press the sliding parts 43 onto the sliding surface of the sleeve 11. Frame 44 has the shape of a bellows thereby assuring an automatic adjustment of the sliding part 43. When attaching the frame the latter is first pressed into the groove 40 by means of frame 45. The frame 46 is arranged on frame 45, the free end of frame 44 is bent over frame 46 and finally the sliding part 43 is put and pressed on the whole so that the two frames 45, 46 are located in their respective grooves and clamp frame 44.

According to Figs. 11 and 12 sliding part 47 is tightened on the part 48 of the cylinder containing the inlet and outlet channels $d$ and $k$ also by means of a frame 49 of flexible and gas tight material. Frame 49 is secured in slot 51, said slot being disposed around the opening $e$, by means of a wedge shaped frame 50. Its lug shaped end is pressed against the wall of part 48 by the fluid pressure in channel $d$. The leaf springs 52 press the sliding parts on the moving surfaces of member 10. This modification shows also that it is possible to make use of two different modes of tightening at the same time. Sliding part 47 is provided with a frame shaped member 53 which is introduced in the opening of part 48. The wedge shaped frames 45, 46 and 50 clamp the flexible material into the slot and they cannot loosen themselves if the angle of wedge of the slot is made smaller than the angle of friction. In the same manner bellows and membranes may be fixed to the drum or to the piston.

In the piston 55 (see Figs. 13 and 14) the ducts 54 of the piston are movably guided and during the movement they slide on the cylindrical part 56 of the casing, said part 56 containing the inlet and outlet channels $d$ and $k$ and the openings $e$ and $i$ as well. The sliding surfaces 57 (see Figs. 15 and 16) have a rectangular shape and are so shaped as to cooperate with the cylindrical surface part of part 56. The membranes 21 are secured to the outer end of the ducts 54 by means of spring rings 58 and grooves 59. At the place where the membranes are fixed the channels have an elliptical cross section; therefore the rings 58 clamp the flexible members with the same stress on the whole circumference. A sharp bending of the flexible members is obviated by frame 60 (Fig. 17) arranged on the parts 54 and the flexible members. The necessary pressure for an accurate tightening is obtained by springs 61 which are attached to the inner ends of frame 60. The outer edges of the walls of the parts 54 near part 56 touch each other or nearly touch each other. For this reason the diameter of the sliding surface of part 56 should not become smaller by wear because then the parts 54 would prevent one another from being automatically adjusted. The parts 54 are for this reason made of softer material than part 56 so that only the parts 54 are subjected to wear. In gas meters with a high number of revolutions a counterweight is used so as to prevent a considerable diminution of the pressure or a loosening of the parts 54 from part 56 by the centrifugal force (see Fig. 17). Piston body 63 is provided with bearings 64 for the double armed levers 65 on one end of which are arranged the counterweights 62. To the other end draw rods 66 are journalled which, on their other ends, are journalled to frame 60. The leaf springs 67 press on the weights 62, and by way of levers 65 and rods 66 also on the parts 54 and they press these parts 54 tightly on the sliding surface of part 56.

The flexible members 21 are fixed to the parts 68 of the drum and in an identical manner also to the piston by means of a resilient wedge shaped frame 69, (see Fig. 18). Flexible member 21 is laid on collar 70 of part 68 and frame 69 is pressed, together with the end of member 21, into the groove formed by the collar. Fig. 18 shows in dotted lines the cross section of frame 69 before same has been pressed into the slot. It is made of a resilient material, as for instance of steel-sheet which, when pressed into the slot is only subjected to an elastic deformation. The connection is easily detachable.

Figs. 19 and 20 show modifications where the fixing of the flexible and gas tight material 71 is similar to that already described. Said material 71 is fixed to part 72 or 73 corresponding to part 68 by means of a wedge shaped frame 74, 75.

In the modification shown in Fig. 21 the drum or piston part 76 is frusto-conical in cross section at the top. By means of a frame 77 the gas tight and flexible material is secured to part 76, frame 77 having an identical angle of cone.

In the modification shown in Figs. 22 and 23 the flexible and gas tight material 79 and 80 is attached by means of frames 83 and 84, said frames consisting of plastic material, as for instance lead. The frames 83 and 84 are pressed together with the material 79 and 80 into slots of the parts 81 and 82.

All the different modes of attaching the membranes have one identical characteristic and this is an absolutely gas tight connection of the flexible and tight material with the mechanical parts of the gas meter, whereby the tight connection is the result only of the use of a clamping frame.

The piston and drum are preferably mounted in ball bearings so as to reduce the resistance. As these bearings are subjected only to very small stresses the inner and outer ball races of same can be made of sheet iron (see Figs. 24 and 25). The ball races 85 and 86 (see Fig. 24) are made each of one piece whereas the ball races shown in Fig. 25 consist each of two parts. The outer ball race is formed by the iron sheet parts 87 and 88 whereas the inner ball race is formed by the parts 89 and 90. The ball races must not be as round as they are shown in the drawings and it is possible to give the ball races such a shape that the balls run only on two edges of the ball races, said edges being of course always an equal distance the one from the other. Instead of ball bearings roller bearings might be provided for. Because the stress of these bearings is only very small, the number of the balls or rollers can be kept very low. Another construction of the bearing consists in the arranging of rollers which bear the drum, said rollers being rotatably mounted in the front walls of the drum or casing and roll on roller races of the drum or the casing during the movement of the device.

The modifications shown in the drawings show a centrally disposed inlet and outlet. The openings for the medium entering the working chambers can also be disposed on the periphery mantle or on the front walls of the drum. The fixing of the flexible members remains as has been described in the foregoing description, only the piston is, in this case, preferably mounted on an axle which is borne by the casing.

The gas tight guiding of the piston on the part of the cylinder 4 containing the inlet and outlet channels by means of two half cylindrically shaped sliding members on the inlet and outlet side of the cylinder 4, said sliding members being broader than the inlet and outlet opening of the cylinder 4 and the piston body and which are pressed by resilient means onto the sliding surface of the piston, has the advantage that the sliding members adjust themselves automatically if they get worn during the use of the device. In this way wear of the parts can be continuously compensated for. Also the sliding members are easily interchangeable. Another advantage of the device, according to the invention, consists in the fact that each working chamber consisting of a part of the drum, the flexible member, and a channel can be made separately and, before mounting same in the device, can be controlled as to its tightness. The channels of the working chambers are preferably so broad as to touch each other with their edges formed by the sliding surfaces and the side walls parallel to the piston axis. The counterweights provided for the movably guided parts of the channels serve to compensate for the centrifugal force acting on the channels. Therefore the pressure of the channel parts on the sliding surface of the cylinder 4 is always or nearly always the same and independent of the number of revolutions. By suitably choosing the counterweight the pressure above referred to can be made to increase or decrease with an increase of the number of revolutions.

The device hereinbefore described is my preferred embodiment of the invention. It is obvious, however, that it can be departed from to a considerable extent without departing from the spirit of the invention.

Having thus described my invention, what I claim and desire to secure by U. S. Letters Patent is:—

1. In apparatus of the character described, a stationary casing having an inlet socket and an outlet socket, a drum having a pair of side walls and a peripheral wall, means to mount said drum in said casing to rotate freely therein, a piston, means to mount said piston to rotate on an axis eccentric with respect to the drum, a plurality of gas-tight chambers on said drum between said piston and said peripheral wall and each including a flexible wall, the flexible wall of one chamber being independent of the flexible walls of the other chambers, means to admit fluid to said chambers from said inlet socket and discharge the same from said chambers to said outlet socket, coupling rods journalled to the piston and drum at equal distances apart, the length of said rods being equal to the eccentricity of the piston, and means to connect said rods to the piston and drum in virtue of which the rods are put under tension stresses only.

2. In apparatus of the character described, a stationary casing having an inlet socket and an outlet socket, a drum having a pair of side walls and a peripheral wall, means to mount said drum in said casing to rotate freely therein, a cylindrical shaft fixedly located eccentrically in said casing and having an inlet channel and an outlet channel respectively communicating with said inlet and outlet sockets, said shaft having inlet and outlet ports respectively, a piston rotatably mounted on said shaft over said inlet and outlet ports, two half cylindrical tightly-guided parts on said shaft between it and the adjacent bearing surface of said piston, resilient means to press said guided parts in contact with the bearing surface of said piston, said guided parts having inlet and outlet port portions cooperating respectively with the inlet and outlet ports of said shaft, a plurality of gas-tight chambers in said drum between said piston and said peripheral wall and each including a flexible wall, and means to admit fluid into said chambers via said piston and the inlet port of said shaft and to discharge the same from said chambers via said piston and the outlet port of said shaft.

3. In apparatus of the character described, a stationary casing having an inlet socket and an outlet socket, a drum having a pair of side walls and a peripheral wall, means to mount said drum in said casing to rotate freely therein, a cylindrical shaft fixedly located eccentrically in said casing and having an inlet channel and an outlet channel respectively communicating with said inlet and outlet sockets, said shaft having inlet and outlet ports respectively, a piston rotatably mounted on said shaft over said inlet and outlet ports, two half cylindrical tightly-guided parts on said shaft between it and the adjacent bearing surface of said piston, resilient means to press said guided parts in contact with the bearing surface of said piston, said guided parts having inlet and outlet port portions cooperating respectively with the inlet and outlet ports of said shaft, a plurality of gas-tight chambers in said drum between said piston and said peripheral wall and each including a flexible wall, means to admit fluid into said chambers via said piston and the inlet port of said shaft and to discharge the same from said chambers via said piston and the outlet port of said shaft, and means to effect a gas-tight seal around the inlet and outlet ports respectively between said shaft and said guided parts.

4. In apparatus of the character described, a stationary casing having an inlet socket and an outlet socket, a drum having a pair of side walls and a peripheral wall, means to mount said drum in said casing to rotate freely therein, a cylindrical shaft fixedly located eccentrically in said casing and having an inlet channel and an outlet channel respectively communicating with said inlet and outlet sockets, said shaft having inlet and outlet ports respectively, a piston rotatably mounted on said shaft over said inlet and outlet ports, two half cylindrical tightly-guided parts on said shaft between it and the adjacent bearing surface of said piston, resilient means to press said guided parts in contact with the bearing surface of said piston, said guided parts having inlet and outlet port portions cooperating respectively with the inlet and outlet ports of said shaft, a plurality of gas-tight chambers in said drum between said piston and said peripheral wall and each including a flexible wall, means to admit fluid into said chambers via said piston and the inlet port of said shaft and to discharge the same from said chambers via said piston and the outlet port of said shaft, and flexible gas-tight members around the inlet and outlet ports respectively of said shaft and said guided parts and located between said shaft and said sliding parts to effect a gas-tight seal between the same.

5. In apparatus of the character described, a stationary casing having an inlet socket and an outlet socket, a drum having a pair of side walls and a peripheral wall, means to mount said drum in said casing to rotate freely therein, a cylindrical shaft fixedly located eccentrically in said casing and having an inlet channel and an outlet channel respectively communicating with said inlet and outlet sockets, said shaft having inlet and outlet ports respectively, a piston rotatably mounted on said shaft over said inlet and outlet ports, two half cylindrical tightly-guided parts on said shaft between it and the adjacent bearing surface of said piston, resilient means to press said guided parts in contact with the bearing surface of said piston, said guided parts having inlet and outlet port portions cooperating respectively with the inlet and outlet ports of said shaft, a plurality of gas-tight chambers in said drum between said piston and said peripheral wall and each including a flexible wall, and means to admit fluid into said chambers via said piston and the inlet port of said shaft and to discharge the same from said chambers via said piston and the outlet port of said shaft, said guided parts having portions projecting into the inlet and outlet openings respectively of said shaft and in sliding contact with the walls thereof.

6. In apparatus of the character described, a stationary casing having an inlet socket and an outlet socket, a drum having a pair of side walls and a peripherial wall, means to mount said drum in said casing for free rotation therein, a shaft eccentrically mounted in said casing and having an inlet and an outlet duct in communication respectively with said inlet socket and said outlet socket, and having an inlet port and an outlet port, a piston rotatable on said shaft over the inlet and outlet ports thereof, said piston having a set of radial ducts adapted for communication with said inlet and outlet ports alternately as the piston rotates, said peripheral wall having a set of flanges corresponding to said radial ducts, flexible walls embracing and connecting said radial ducts to the respective flanges to constitute separate and individual chambers, in virtue of all of which fluid will flow from said inlet socket through the inlet duct and inlet port of said shaft into said chambers via the radial ducts thereof and flow from said chambers via said radial ducts, said outlet port and outlet duct of said shaft to said outlet socket, said radial ducts being of greater breadth than said inlet and outlet ports, means to mount said radial ducts for sliding movement radially of said shaft, and means to maintain pressure contact between the inner ends of said radial ducts and the outer surface of said shaft.

7. In apparatus of the character described, a stationary casing having an inlet socket and an outlet socket, a drum having a pair of side walls and a peripheral wall, means to mount said drum in said casing for free rotation therein, a shaft eccentrically mounted in said casing and having an inlet and an outlet duct in communication respectively with said inlet socket and said outlet socket, and having an inlet port and an outlet port, a piston rotatable on said shaft over the inlet and outlet ports thereof, said piston having a set of radial ducts adapted for communication with said inlet and outlet ports alternately as the piston rotates, said peripheral wall having a set of flanges corresponding to said radial ducts, flexible walls embracing and connecting said radial ducts to the respective flanges to constitute separate and individual chambers, in virtue of all of which fluid will flow from said inlet socket through the inlet duct and inlet port of said shaft into said chambers via the radial ducts thereof and flow from said chambers via said radial ducts, said outlet port and outlet duct of said shaft to said outlet socket, said radial ducts being of greater breadth than said inlet and outlet ports, means to mount said radial ducts for sliding movement radially of said shaft, and means to maintain pressure contact between the inner ends of said radial ducts and the outer surface of said shaft, the said inner ends conforming to the curvature of said outer surface.

8. In apparatus of the character described, a stationary casing having an inlet socket and an outlet socket, a drum having a pair of side walls and a peripheral wall, means to mount said drum in said casing for free rotation therein, a shaft eccentrically mounted in said casing and having an inlet and an outlet duct in communication respectively with said inlet socket and said outlet socket, and having an inlet port and an outlet port, a piston rotatable on said shaft over the inlet and outlet ports thereof, said piston having a set of radial ducts adapted for communication with said inlet and outlet ports alternately as the piston rotates, said peripheral wall having a set of flanges corresponding to said radial ducts, flexible walls embracing and connecting said radial ducts to the respective flanges to constitute separate and individual chambers, in virtue of all of which fluid will flow from said inlet socket through the inlet duct and inlet port of said shaft into said chambers via the radial ducts thereof and flow from said chambers via said radial ducts, said outlet port and outlet duct of said shaft to said outlet socket, said radial ducts being of greater breadth than said inlet and outlet ports, means to mount said radial ducts for sliding movement radially of said shaft, and means to maintain pressure contact between the inner ends of said radial ducts and the outer surface of said shaft, the said inner ends conforming to the curvature of said outer surface, said radial ducts being made of a softer material than that of said shaft.

9. In apparatus of the character described, a stationary casing having an inlet socket and an outlet socket, a drum having a pair of side walls and a peripheral wall mounted to rotate freely within said casing, a stationary shaft within the casing and located eccentrically with respect to said drum, said shaft having an inlet duct in communication with said inlet socket and an outlet duct in communication with said outlet socket, and having an inlet port for the inlet duct and an outlet port for the outlet duct, a piston comprising a shell rotatably mounted on said shaft, a set of radial ducts carried by said shell, the inner ends of said radial ducts registering alternately with and being of greater area than said inlet and outlet ports, and flexible fluid-tight aprons each separately secured to a radial duct and to a portion of the peripheral wall of said drum to comprise a set of fluid chambers, said radial ducts being radially movably mounted in said shell with their inner ends engaging and conforming to the surface of said shaft, and spring actuated means to maintain said ducts in contact with said shaft.

10. Improvement in rotary blowers, gas meters, liquid meters, rotary compressors or rotary pumps comprising a stationary casing having an inlet socket and an outlet socket, a drum having a pair of side walls and a peripheral mantle and being freely rotatably mounted in said casing, a piston mounted to rotate on an axis eccentrical with respect to the drum, a plurality of tight chambers in said drum, means to admit fluid to said chambers from said inlet socket and discharge the fluid from said chambers to said outlet socket, said plurality of chambers being formed by a plurality of gas-tight flexible members of a tight and flexible material, a piston rotating on a hollow shaft, two channels in said shaft, two half cylindrical, tightly guided sliding parts on said shaft, said sliding parts being broader than the inlet and outlet openings of the hollow shaft, resilient means to press the sliding parts onto the adjacent surface of the piston, a tight and flexible material disposed around the inlet and the outlet openings of the shaft, a lug of the said material tightening the slot between shaft and sliding parts, a wedge shaped groove in the hollow shaft, a clamping frame in said groove of identical size and a cross section which differs from that of the groove only by the thickness of the tight and flexible material.

11. Improvement in rotary blowers, gas meters, liquid meters, rotary compressors or rotary pumps comprising a stationary casing having an inlet socket and an outlet socket, a drum having a pair of side walls and a peripheral mantle and being freely rotatably mounted in said casing, a piston mounted to rotate on an axis eccentrical with respect to the drum, a plurality of tight chambers in said drum, means to admit fluid to said chambers from said inlet socket and discharge the fluid from said chambers to said outlet socket, said plurality of chambers being formed by a plurality of gas-tight flexible members of a tight and flexible material, a piston rotating on a hollow shaft, two channels in said shaft, two half cylindrical, tightly guided sliding parts on said shaft, said sliding parts being broader than the inlet and outlet openings of the hollow shaft, resilient means to press the sliding parts onto the adjacent surface of the piston, a tight and flexible material disposed around the inlet and the outlet openings of the shaft, a lug of the said material tightening the slot between shaft and sliding parts, a wedge shaped groove in the part sliding on the hollow shaft, a clamping frame in said groove of similar size and a cross section which differs from that of the groove only by the thickness of the tight and flexible material.

ROMAN RUMMEL.